US011968522B2

(12) United States Patent
Ehara et al.

(10) Patent No.: US 11,968,522 B2
(45) Date of Patent: Apr. 23, 2024

(54) ELECTRICAL DEVICE, SEARCH DEVICE, DEVICE SEARCH SYSTEM, ELECTRICAL DEVICE RESPONSE METHOD, ELECTRICAL DEVICE SEARCH METHOD, AND STORAGE MEDIUM

(71) Applicant: PANASONIC INTELLECTUAL PROPERTY MANAGEMENT CO., LTD., Osaka (JP)

(72) Inventors: Yusuke Ehara, Osaka (JP); Toyoshi Yamada, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 317 days.

(21) Appl. No.: 17/294,647

(22) PCT Filed: Aug. 12, 2020

(86) PCT No.: PCT/JP2020/030721
§ 371 (c)(1),
(2) Date: May 17, 2021

(87) PCT Pub. No.: WO2021/171651
PCT Pub. Date: Sep. 2, 2021

(65) Prior Publication Data
US 2022/0312194 A1 Sep. 29, 2022

(30) Foreign Application Priority Data
Feb. 26, 2020 (JP) ................ 2020-030260

(51) Int. Cl.
H04W 12/02 (2009.01)
H04W 12/122 (2021.01)

(52) U.S. Cl.
CPC ......... H04W 12/02 (2013.01); H04W 12/122 (2021.01)

(58) Field of Classification Search
CPC ... H04W 12/02; H04W 12/122; H04W 12/03; H04W 8/005
See application file for complete search history.

(56) References Cited

U.S. PATENT DOCUMENTS

2003/0216144 A1* 11/2003 Roese ............... H04L 67/51
455/456.2
2007/0050261 A1* 3/2007 Lin ................. G06Q 20/203
705/28

(Continued)

FOREIGN PATENT DOCUMENTS

JP 2009-223873 A 10/2009
JP 2010-045811 A 2/2010

(Continued)

OTHER PUBLICATIONS

International Search Report and Written Opinion dated Oct. 13, 2020 in International Patent Application No. PCT/JP2020/030721; with partial English translation.

Primary Examiner — Robert B Leung
(74) Attorney, Agent, or Firm — Rimon P.C.

(57) ABSTRACT

A first electrical device includes: a second radio signal receiver that receives target device information; a second processor that determines whether or not the first electrical device is included in the target device information and the first electrical device is connected to a network or whether or not a second electrical device capable of communicating with the first electrical device is included in the target device information and the second electrical device capable of communicating with the first electrical device is connected to the network; and a transmitter that, when a result of the determination by the second processor indicates that the first (Continued)

electrical device or the second electrical device is included in the target device information, transmits information indicating that the first electrical device or the second electrical device is the search-target device, as a response using a communication method based on the result of the determination.

13 Claims, 6 Drawing Sheets

(56) References Cited

U.S. PATENT DOCUMENTS

| | | | |
|---|---|---|---|
| 2007/0069004 A1* | 3/2007 | Adler | H04W 4/02 |
| | | | 235/375 |
| 2014/0288966 A1* | 9/2014 | Kaniyur-Subbian | G16H 40/40 |
| | | | 705/3 |
| 2016/0092882 A1* | 3/2016 | Small | G06Q 30/014 |
| | | | 705/303 |
| 2017/0034668 A1* | 2/2017 | Berentsen | H04W 4/33 |
| 2017/0265027 A1 | 9/2017 | Najari et al. | |
| 2017/0301160 A1* | 10/2017 | Somani | H04N 7/183 |
| 2018/0219869 A1 | 8/2018 | Kumar et al. | |

FOREIGN PATENT DOCUMENTS

| | | |
|---|---|---|
| JP | 2016-046596 A | 4/2016 |
| JP | 2017-525199 A | 8/2017 |
| JP | 2017-162462 A | 9/2017 |
| WO | 2015/189161 A1 | 12/2015 |

* cited by examiner

ELECTRICAL DEVICE, SEARCH DEVICE, DEVICE SEARCH SYSTEM, ELECTRICAL DEVICE RESPONSE METHOD, ELECTRICAL DEVICE SEARCH METHOD, AND STORAGE MEDIUM

CROSS-REFERENCE OF RELATED APPLICATIONS

This application is the U.S. National Phase under 35 U.S.C. § 371 of International Patent Application No. PCT/JP2020/030721, filed on Aug. 12, 2020, which in turn claims the benefit of Japanese Application No. 2020-030260, filed on Feb. 26, 2020, the entire disclosures of which Applications are incorporated by reference herein.

TECHNICAL FIELD

The present disclosure relates to electrical devices, search devices, device search systems, electrical device response methods, electrical device search methods, and storage media.

BACKGROUND ART

Patent Literature (PTL) 1 discloses a wide-area electrical device search system including an electrical device to be searched for, an outdoor device installed outdoors, and a search device carried by a person searching for the electrical device. The electrical device includes a wireless tag means that transmits, by radio signals, a device number including at least one of the model number and the production number of the electrical device. The outdoor device includes an outdoor relay means that relays the radio signals including the device number transmitted by the wireless tag means and further relays the relayed radio signals. The search device includes a reception means that receives the radio signals transmitted by the wireless tag means and receives the signals relayed by the relay means.

CITATION LIST

Patent Literature

[PTL 1] Japanese Unexamined Patent Application Publication No. 2009-223873

SUMMARY OF INVENTION

Technical Problem

In the case of electrical devices, etc., including the aforementioned conventional wide-area electrical device search system, a search-target device which is the electrical device regularly transmits the device number by the radio signals, and thus it is possible to locate the search-target device to be recalled. However, since the search-target device continues to regularly transmit the radio signals, there is a risk that a person with malicious intent may read the radio signals. Therefore, privacy in property where the search-target device is installed is threatened, and security concerns are raised.

Thus, an object of the present disclosure is to provide an electrical device, etc., with which a search-target device can be easily located and degradation in the security of property where the search-target device is installed can be minimized.

Solution to Problem

In order to achieve the aforementioned object, an electrical device according to one aspect of the present disclosure includes: a receiver that receives target device information indicating a search-target device to be searched for; a processor that determines whether or not the electrical device is included in the target device information received and the electrical device is connected to a network or whether or not a communication device capable of communicating with the electrical device is included in the target device information received and the communication device is connected to the network; and a transmitter that, when a result of the determination by the processor indicates that the electrical device or the communication device is included in the target device information, transmits information indicating that the electrical device or the communication device is the search-target device, as a response using a communication method based on the result of the determination.

Note that the above general or specific aspect may be implemented using a system, a method, an integrated circuit, a computer program, or a computer-readable recording medium such as a compact disc read-only memory (CD-ROM), or any combination of systems, methods, integrated circuits, computer programs, or recording media.

Advantageous Effects of Invention

With an electrical device, etc., according to the present disclosure, it is possible to easily locate a search-target device and minimize degradation in the security of property where the search-target device is installed.

DESCRIPTION OF EMBODIMENTS

Figure 1:
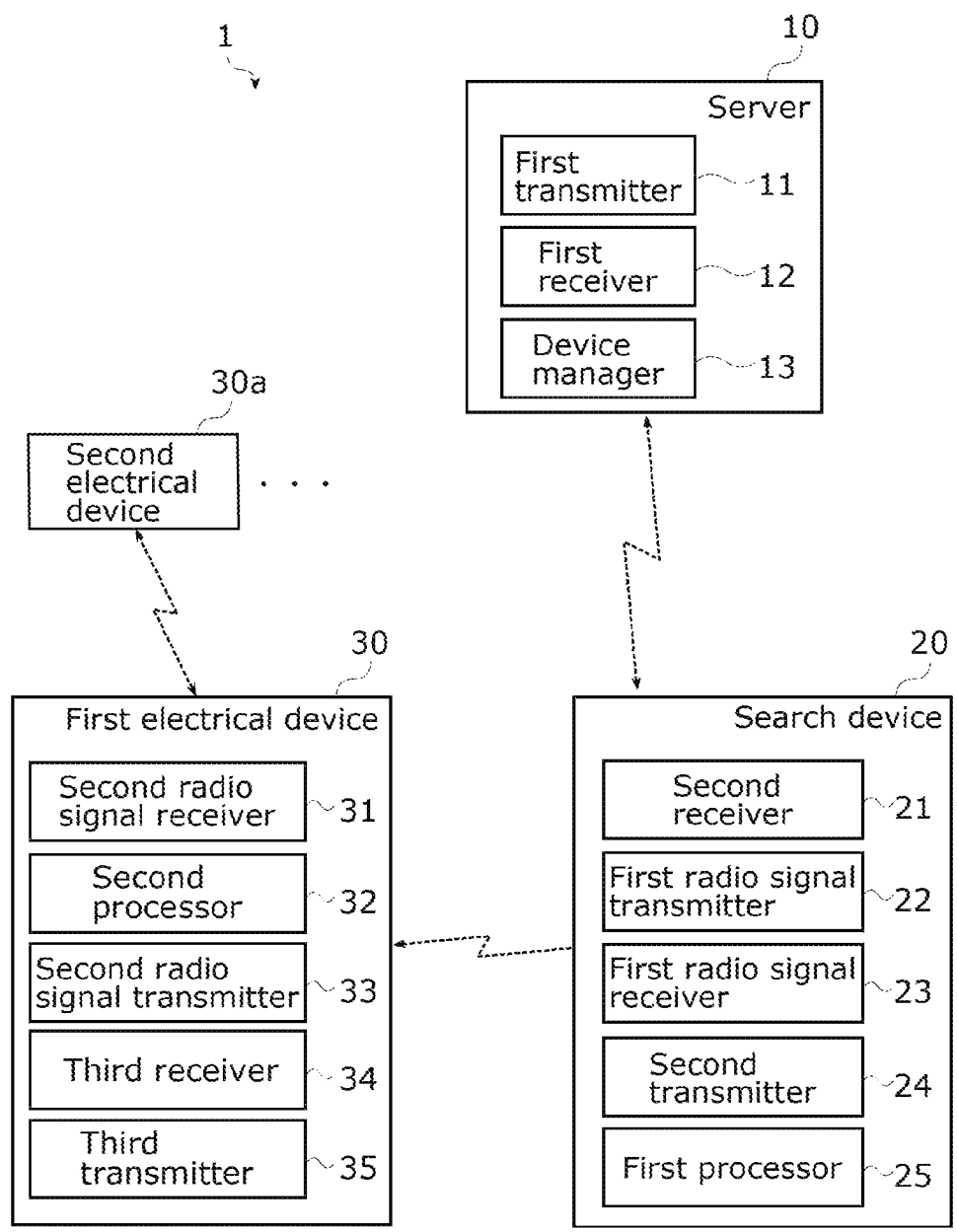
FIG. 1 is a block diagram illustrating one example of a device search system according to an embodiment.

[Underlying Knowledge Forming Basis of the Present Disclosure]

For example, unlike automobiles and the like for which periodic inspection and owner registration are mandatory, household electrical devices such as televisions, heating and cooling appliances, and refrigerators are difficult for manufacturers to locate even when a recall is announced in the event of, for example, discovery of a significant defect.

Thus, in order to locate an electrical device, when or after the electrical device is purchased, a user is asked to register the product via a network or the like so that the manufacturer can obtain user information and the location of the electrical device to be recalled. This allows the manufacturer to locate the product and proceed with the product recovery process including individually contacting or visiting the user. However, the number of users who complete the registration via a network or the like is still small, resulting in a situation in which the recovery of an electrical device to be recalled is difficult.

In the case of the electrical device disclosed in PTL 1, even when not connected to a network, the search-target device which is the electrical device regularly transmits the device number by the radio signals, and thus it is possible to locate the search-target device to be recalled. However, since the search-target device continues to regularly transmit the radio signals, there is a risk that a person with malicious intent may intercept the radio signals and read the device number indicated by the radio signals. Therefore, the privacy of a user who owns the search-target device may be threatened, and security concerns are raised.

Thus, an object of the present disclosure is to provide an electrical device, etc., with which a search-target device can be easily located and degradation in the security of property where the search-target device is installed can be minimized.

Each embodiment described below shows a general or specific example. The numerical values, shapes, materials, structural elements, and the arrangement and connection of the structural elements, steps, the processing order of the steps etc., shown in the following embodiment are mere examples, and therefore do not limit the present disclosure. Among the structural elements in the following embodiment, structural elements not recited in any one of the independent claims are described as arbitrary structural elements.

Note that the figures are schematic diagrams and are not necessarily precise illustrations. In the figures, substantially identical structural elements are assigned the same reference signs.

Hereinafter, an embodiment will be described with reference to the drawings where appropriate. However, there are instances where overly detailed description will be omitted. For example, there are cases where detailed description of well-known matter or overlapping description of substantially identical elements will be omitted. This is in order to prevent the subsequent description from becoming overly verbose and to facilitate the understanding of a person having ordinary skill in the art.

EMBODIMENT

<Configuration: Device Search System 1>

FIG. 1 is a block diagram illustrating one example of device search system 1 according to an embodiment.

As illustrated in FIG. 1, device search system 1 includes server 10, search device 20, and first electrical device 30.

[Server 10]

Server 10 manages target device information of a search-target device in order to recall a defective electrical device in the event of discovery of a defect in produced electrical devices. Here, the search-target device is an electrical device to be recalled, in other words, a specific electrical device to be searched for. For example, in the case where there are two or more search-target devices, server 10 creates a search-target device list to manage the two or more search-target devices.

Server 10 is capable of performing wired or wireless communication with at least search device 20 via a network. When first electrical device 30 is connected to a network, server 10 is capable of communicating with first electrical device 30 via a wired or wireless connection. The network is a wide area network such as the Internet or a local area network. In the present embodiment, the network is a wide area network.

Server 10 includes first transmitter 11, first receiver 12, and device manager 13.

First transmitter 11 transmits, to search device 20, target device information indicating a search-target device that is an electrical device. Here, the target device information indicates a search-target device having a device number including at least one of a model number, a production number, and the like which are used to identify the search-target device.

When the search-target device is found, first receiver 12 receives target device discovery information which is a response to the transmission of the target device information. Here, the target device discovery information indicates that first electrical device 30, which is a search-target device to be recalled, has been found, and specifically includes information indicating the location of the search-target device and information indicating the device number of the search-target device. Note that the target device discovery information may include position information at the point in time of the discovery of the search-target device by search device 20.

Device manager 13 creates the target device list according to the target device discovery information received by first receiver 12. Here, the target device list includes, for example, the device number of the search-target device and the location of the search-target device associated with the device number.

Device manager 13 has a function of controlling the operation of server 10. Device manager 13 includes, for example, a microcontroller containing a central processing unit (CPU), a storage device such as memory, and an interface for inputting and outputting information. Device manager 13 controls server 10 by the CPU executing, on the basis of an instruction from a user, a program stored in the storage device, for example.

[Search Device 20]

Search device 20 is used to locate the search-target device. Search device 20 starts searching the search-target device on the basis of the target device information received from server 10. Specifically, search device 20 is mounted on a vehicle or the like that travels in a region. In order to find the search-target device, the vehicle or the like transmits target device signals as the target device information while moving around the region and searching everywhere.

Search device 20 includes second receiver 21, first radio signal transmitter 22, first radio signal receiver 23, second transmitter 24, and first processor 25.

Second receiver 21 receives the target device information transmitted by first transmitter 11 of server 10.

When second receiver 21 receives the target device information indicating the search-target device, first radio signal transmitter 22 transmits the target device signals as the target device information. Specifically, first radio signal transmitter 22 transmits the target device signals to the surroundings at predetermined time intervals while moving around the region along with the vehicle. The target device signals transmitted are beacon signals in the present embodiment, but may be Wi-Fi (registered trademark) signals of the Wi-Fi communication or Bluetooth (registered trademark) signals. The target device signals include the target device information, beacon ID, etc. The target device information, etc., included in the target device signals are encrypted. The beacon ID is used to identify the target device signals that are beacon signals. First radio signal transmitter 22 is one example of the signal transmitter.

When first radio signal receiver 23 receives a response signal from first electrical device 30 which is a search-target device, first radio signal transmitter 22 transmits a reception completion signal to first electrical device 30 in response to the response signal received from first electrical device 30. Here, the reception completion signal is a notification indicating that the response signal has been received from first electrical device 30. Both the response signal and the reception completion signal may be beacon signals, Wi-Fi signals, or Bluetooth (registered trademark) signals.

In the case where first electrical device 30 is located nearby, first radio signal receiver 23 receives, from first electrical device 30, a response signal indicating that first electrical device 30 or second electrical device 30a capable of communicating with first electrical device 30 is included in the target device information. Here, the response signal includes information, etc., indicating the device number of first electrical device 30 or second electrical device 30a included in the target device information. The case where first electrical device 30 is located nearby represents a range that the target device signal transmitted by first electrical device 30 can reach. First radio signal receiver 23 is one example of the receiver included in search device 20.

In accordance with the response signal received by first radio signal receiver 23, second transmitter 24 transmits the target device discovery information to server 10 as a notification indicating discovery of first electrical device 30 or second electrical device 30a indicated in the target device information. Second transmitter 24 is one example of the information transmitter.

First processor 25 determines whether or not first radio signal receiver 23 has received the response signal, and when the response signal is received, causes first radio signal transmitter 22 to transmit the reception completion signal and causes second transmitter 24 to transmit the target device discovery information.

First processor 25 has a function of controlling the operation of search device 20. First processor 25 includes, for example, a microcomputer containing a CPU, a storage device such as memory, and an interface for inputting and outputting information. First processor 25 controls search device 20 by the CPU executing, on the basis of an instruction from a user, a program stored in the storage device to cause a computer to perform the electrical device search method, for example. The processing of first processor 25 will be described later.

[First Electrical Device 30]

First electrical device 30 is a household electrical device such as a television, a heating and cooling appliance, and a refrigerator installed in a facility or the like and may be a search-target device to be recalled in which a defect has been found. First electrical device 30 is capable of communicating with second electrical device 30a via a wired or wireless connection and can obtain the device number of second electrical device 30a. Second electrical device 30a is also a household electrical device such as a television, a heating and cooling appliance, and a refrigerator installed in the same facility or the like as first electrical device 30 and may be a search-target device to be recalled in which a defect has been found. In the present embodiment, first electrical device 30 is a television that is frequency connected to a network at the time of use. First electrical device 30 and second electrical device 30a can be connected to a network, but are not required to be connected to a network. First electrical device 30 is one example of the electrical device. Second electrical device 30a is one example of the communication device. Note that device search system 1 may or may not include second electrical device 30a as a structural element.

First electrical device 30 includes second radio signal receiver 31, second processor 32, second radio signal transmitter 33, third receiver 34, and third transmitter 35.

Second radio signal receiver 31 receives the target device signal from search device 20 as the target device information. Furthermore, second radio signal receiver 31 receives the reception completion signal from search device 20 in response to the response signal. Second radio signal receiver 31 is one example of the receiver included in first electrical device 30.

Second processor 32 determines whether or not this device (first electrical device 30) is included in the received target device information and first electrical device 30 is connected to a network or whether or not second electrical device 30a is included in the received target device information and second electrical device 30a is connected to a network. Second processor 32 is one example of the processor.

When third receiver 34 receives the reception completion signal in response to the response signal transmitted to search device 20, second processor 32 transitions from the state of being unable to communicate with second electrical device 30a, that is, a normal operation mode, to a blocking mode. The normal operation mode is a mode in which the device provides a function thereof, for example, in the case where the device is a television, a mode in which video and sound are output. The blocking mode is a mode in which communication with any other electrical devices including second electrical device 30a is disabled and access from other electrical devices is blocked. For example, in the blocking mode, the power sources of second radio signal receiver 31 and third receiver 34 are OFF.

Second processor 32 has a function of controlling the operation of first electrical device 30. Second processor 32 includes, for example, a microcomputer containing a CPU, a storage device such as memory, and an interface for inputting and outputting information. Second processor 32 controls first electrical device 30 by the CPU executing, on the basis of an instruction from a user, a program stored in the storage device to cause a computer to perform the electrical device response method, for example. The processing of second processor 32 will be described later.

When the result of the determination by second processor 32 indicates that first electrical device 30 or second electrical device 30a is included in the target device information, second radio signal transmitter 33 transmits, as a response using a communication method based on the result of the determination, information indicating that first electrical device 30 or second electrical device 30a is the search-target device. Specifically, when first electrical device 30 is included in the target device information in the target device signals and first electrical device 30 or second electrical device 30a is not connected to a network, second radio signal transmitter 33 transmits a response signal (one example of the information indicating that first electrical device 30 or second electrical device 30a is the search-target device, as the response using the communication method based on the result of the determination) to server 10 via search device 20 in response to the target device signals. When first electrical device 30 and second electrical device 30a are included in the target device information and first electrical device 30 or second electrical device 30a is connected to a network, second radio signal transmitter 33 transmits a response signal (one example of the information indicating that first electrical device 30 or second electrical device 30a is the search-target device, as the response using the communication method based on the result of the determination) to server 10 via the network in response to the target device signals. Second radio signal transmitter 33 is one example of the transmitter included in first electrical device 30.

When first electrical device 30 is connected to a network, third receiver 34 receives the target device information from server 10 via the network. Third receiver 34 may be one example of the receiver included in first electrical device 30.

When first electrical device 30 or second electrical device 30a is included in the target device information and first electrical device 30 or second electrical device 30a is connected to a network, third transmitter 35 transmits information indicating that first electrical device 30 or second electrical device 30a is the search-target device, as a response using a communication method based on the result of the determination, that is, response information (one example of the information indicating that first electrical device 30 or second electrical device 30a is the search-target device, as the response using the communication method based on the result of the determination) to server 10 via the network in response to the target device information. Here, the response information indicates that first electrical device 30 or second electrical device 30a is included in the target device information, and specifically includes information, etc., indicating the device number of first electrical device 30. Note that in this case, instead of first electrical device 30, second electrical device 30a may respond to server 10. Third transmitter 35 may be one example of the transmitter included in first electrical device 30.

Note that in the case of receiving the beacon signals from search device 20, first electrical device 30 is not required to include third receiver 34 or third transmitter 35. This means that first electrical device 30 is not required to include a function of connecting to a network.

<Processing>

Figure 2:
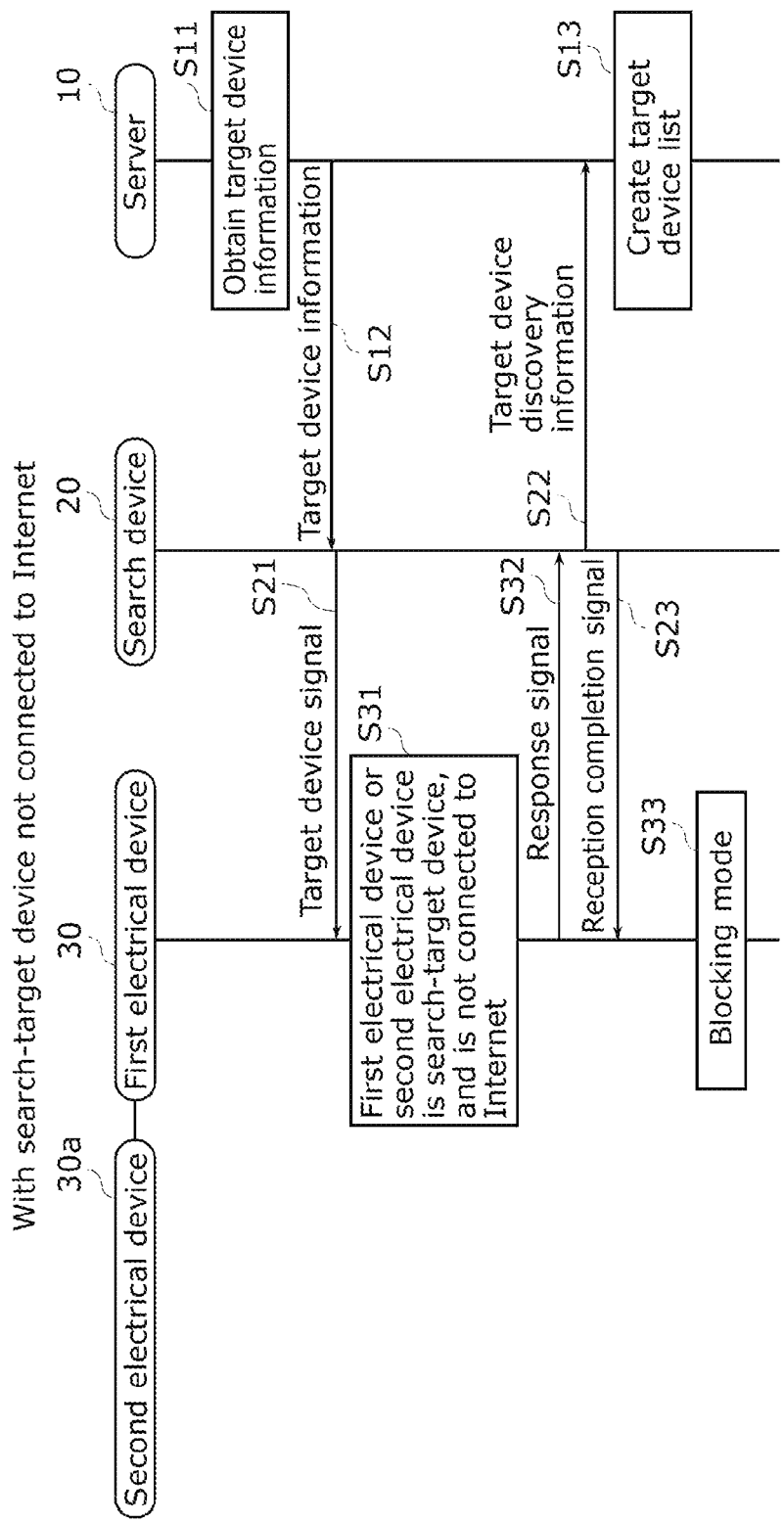
FIG. 2 is a sequence chart illustrating one example of processing performed when an electrical device of a device search system according to an embodiment is not connected to a network.

FIG. 2 is a sequence chart illustrating one example of processing performed when first electrical device 30 of device search system 1 according to the embodiment is not connected to a network. In FIG. 2, it is assumed that first electrical device 30 is not connected to a network.

First, as illustrated in FIG. 2, when a defect is found in produced devices, device manager 13 of server 10 extracts the search-target device to be recalled and obtains the target device information (S11).

Next, in FIG. 2, first transmitter 11 of server 10 attempts to communicate with first electrical device 30, but because first electrical device 30 is not connected to a network, the communication between search device 20 and first electrical device 30 is not established, and server 10 cannot transmit the target device information to first electrical device 30. Therefore, first transmitter 11 of server 10 transmits the target device information to search device 20 (S12).

Next, first processor 25 of search device 20 receives the target device information from server 10 via second receiver 21 of search device 20, first processor 25 encrypts the received target device information to generate target device signals including the target device information. At the time when the vehicle with search device 20 mounted thereon moves around the region, first processor 25 transmits the generated target device signals via first radio signal transmitter 22 at predetermined time intervals (S21).

As a result of the vehicle with search device 20 mounted thereon moving around, there are case where first electrical device 30 is located in a range that the target device signals transmitted by first radio signal transmitter 22 of search device 20 can reach. In this case, second radio signal receiver 31 of first electrical device 30 can receive the target device signals transmitted by search device 20.

Second processor 32 of first electrical device 30 decodes the target device information included in the received target device signals. For example, a decoding key is stored in the storage device or the like mounted in search device 20 in advance at the time of shipment of first electrical device 30 from a factory. The storage device is, for example, read only memory (ROM), flash memory, a hard disk drive (HDD), or the like.

Next, second processor 32 determines, on the basis of the decoded target device information, that first electrical device 30 or second electrical device 30a is the search-target device included in the target device information in the target device signals and first electrical device 30 or second electrical device 30a is not connected to a network (S31).

Next, after making the determination in Step S31, second processor 32 generates a response signal to be transmitted in response to the target device signal and including information indicating the device number of first electrical device 30 or second electrical device 30a. Second processor 32 transmits the generated response signal to search device 20 (S32).

Next, when the response signal is obtained from first electrical device 30, first processor 25 transmits the target device discovery information to server 10 via second transmitter 24 (S22).

Next, when first receiver 12 receives the target device discovery information, device manager 13 of server 10 creates a target device list indicating the location of search device 20 (first electrical device 30 which is the search-target device) (S13). In device search system 1, the target device list is created to be used, for example, to help collect the search-target device.

Furthermore, when the response signal is obtained from first electrical device 30, first processor 25 transmits a reception completion signal via first radio signal transmitter 22 (S23).

When second radio signal receiver 31 receives the reception completion signal, second processor 32 of first electrical device 30 transitions from the normal operation mode to the blocking mode in which communication with other devices is blocked (S33).

Subsequently, device search system 1 ends the processing.

Note that in the case where a device that has received the target device signal is not included in the target device information, the processing may be ended in Step S31.

Thus, with device search system 1, it is possible to expedite the recall of the search-target device. Furthermore, only when the target device signal is transmitted, will the response signal in response to the target device signal be transmitted; thus, it is possible to minimize the occurrence of a person with malicious intent intercepting the target device signal and the response signal.

Figure 3:
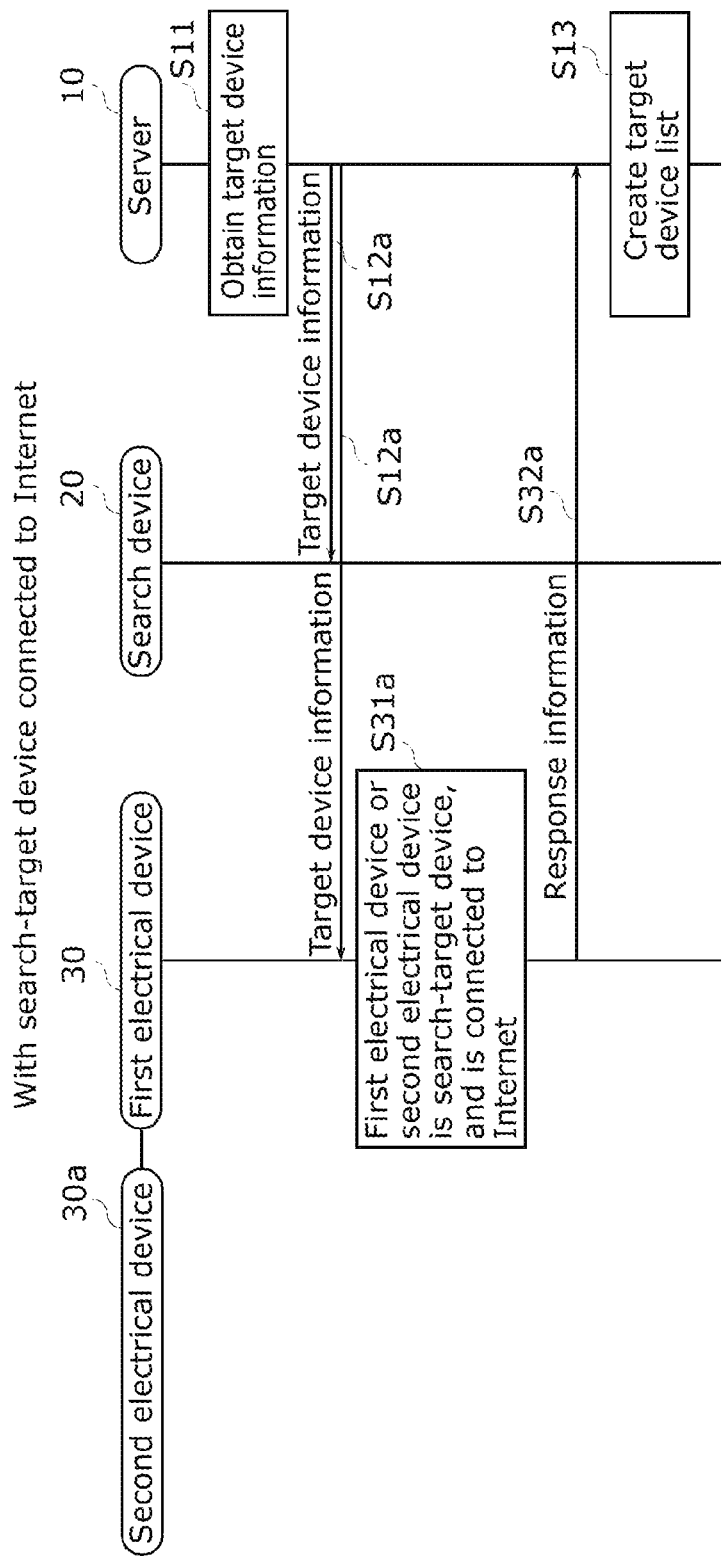
FIG. 3 is a sequence chart illustrating one example of processing performed in the case where an electrical device of a device search system according to an embodiment is connected to a network.

FIG. 3 is a sequence chart illustrating one example of processing performed in the case where first electrical device 30 of device search system 1 according to the embodiment is connected to a network. In FIG. 3, it is assumed that first electrical device 30 is connected to a network.

First, as illustrated in FIG. 3, when a defect is found in produced devices, device manager 13 of server 10 extracts first electrical device 30 to be recalled and obtains the target device information (S11).

Next, in FIG. 3, since first electrical device 30 is connected to a network, an attempt by first transmitter 11 of server 10 to communicate with first electrical device 30 results in establishment of communication between search device 20 and first electrical device 30. Therefore, server 10 can transmit the target device information to first electrical device 30. First transmitter 11 of server 10 transmits the target device information to search device 20 and first electrical device 30 (S12a). Note that the target device information may have been encrypted.

Next, when second processor 32 receives the target device information via third receiver 34, second processor 32 determines, on the basis of the received target device information, that first electrical device 30 or second electrical device 30a is the search-target device included in the target device information and first electrical device 30 or second electrical device 30a is connected to the network (S31a).

Next, after making the determination in Step S31a, second processor 32 generates response information that is a response signal to be transmitted in response to the target device signal and including information indicating the device number of first electrical device 30 or second electrical device 30a. Second processor 32 transmits the generated response information to server 10 (S32a).

Next, when first receiver 12 receives the target device discovery information, device manager 13 of server 10 creates a target device list indicating the location of first electrical device 30 (S13).

Subsequently, device search system 1 ends the processing.

Figure 4:
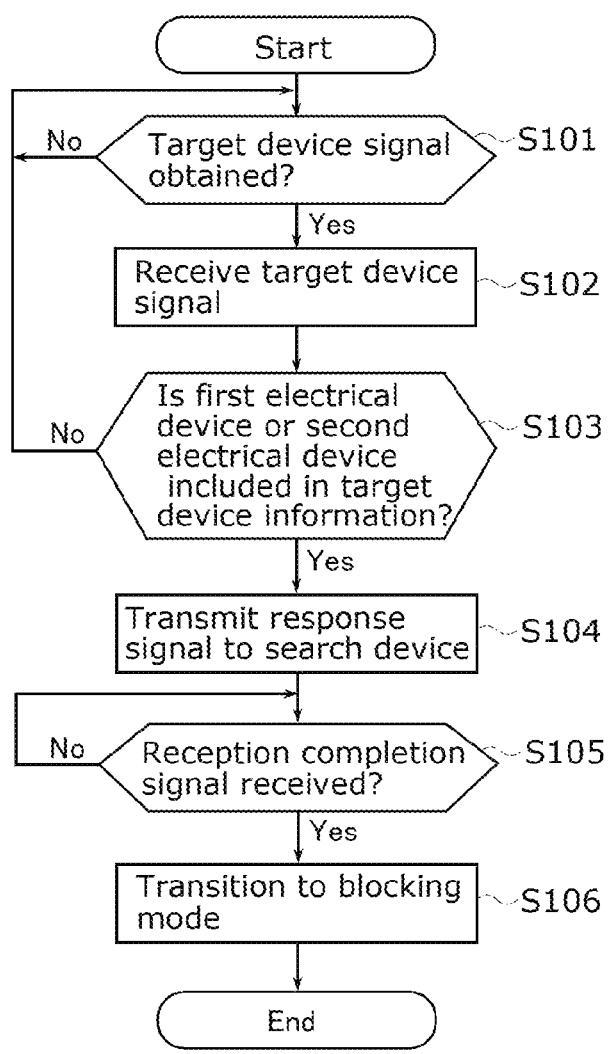
FIG. 4 is a flowchart illustrating one example of processing performed when an electrical device of a device search system according to an embodiment is not connected to a network.

FIG. 4 is a flowchart illustrating one example of processing performed when first electrical device 30 of device search system 1 according to the embodiment is not connected to a network. With reference to FIG. 4, the processing of first electrical device 30 will be described.

First, the processing performed when first electrical device 30 or second electrical device 30a is the search-target device, as illustrated in FIG. 4, will be described.

Second processor 32 determines whether first electrical device 30 is not connected to a network. For example, second processor 32 checks the state of communication of third receiver 34 and third transmitter 35 to determine whether or not there is a network connection. When second processor 32 determines the state of not being connected a network, second processor 32 determines whether or not the target device signal has been obtained (S101). When the target device signal has not been obtained (No in Step S101), second processor 32 returns the processing to Step S101. In other words, second processor 32 enters into a signal standby state that allows reception of the target device signal transmitted by search device 20.

Next, in the case where the target device signal has been obtained (Yes in Step S101), when second radio signal receiver 31 receives the target device signal (S102), second processor 32 determines whether or not first electrical device 30 or second electrical device 30a is included in the search-target device to be recalled that is indicated in the target device information in the form of the target device signal (S103).

Next, when first electrical device 30 or second electrical device 30a is not included in the search-target device to be recalled that is indicated in the target device information (No in Step S103), second processor 32 returns the processing to Step S101.

Furthermore, when first electrical device 30 or second electrical device 30a is included in the search-target device to be recalled that is indicated in the target device information (Yes in Step S103), second processor 32 generates a response signal to be transmitted in response to the target device signal and including information indicating the device number of first electrical device 30 or second electrical device 30a. Second processor 32 transmits the generated response signal to search device 20 (S104).

Next, second processor 32 determines whether or not second radio signal receiver 31 has received the reception completion signal (S105). When second radio signal receiver 31 has not received the reception completion signal (No in S105), second processor 32 returns the processing to Step S105. Note that when the reception completion signal is not received for a predetermined period or longer after the process in Step S104 is performed, second processor 32 may perform the process in Step S104 again and end the processing of first electrical device 30. Note that Steps S105 and S106 are not essential processes and may be omitted.

When second radio signal receiver 31 receives the reception completion signal (Yes in S105), second processor 32 transitions from the normal operation mode to the blocking mode in which communication with other devices is blocked (S106). Subsequently, second processor 32 ends the processing.

Figure 5:
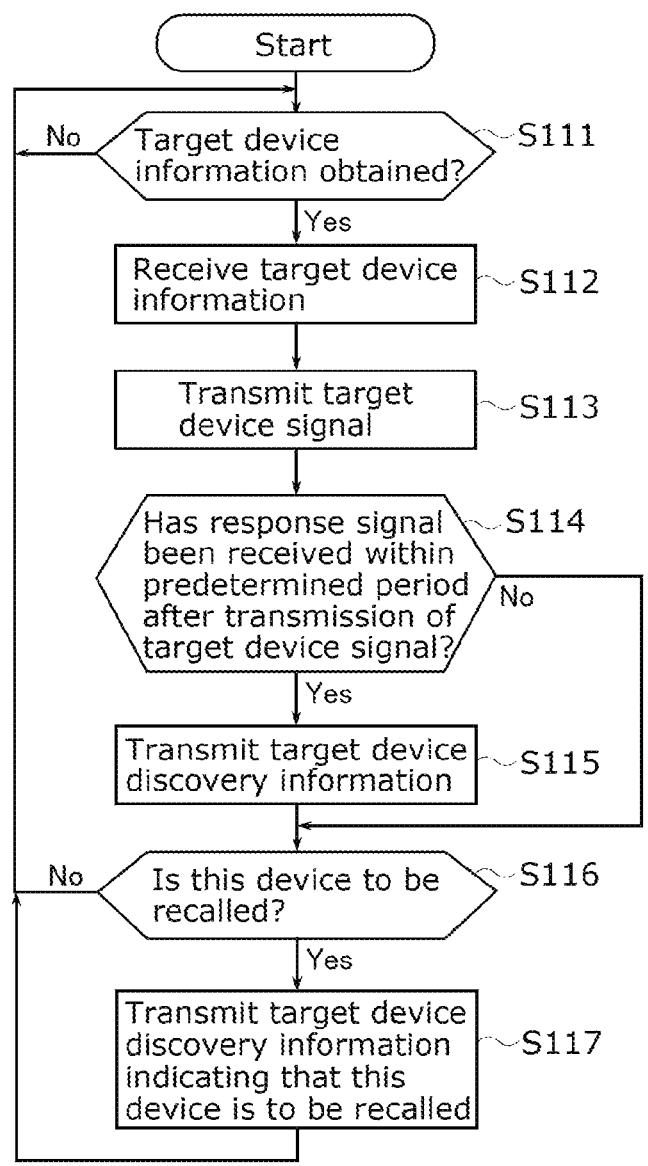
FIG. 5 is a flowchart illustrating one example of processing performed by a search device of a device search system according to an embodiment.

FIG. 5 is a flowchart illustrating one example of processing performed by search device 20 of device search system 1 according to the embodiment. FIG. 5 illustrates the case where search device 20 is connected to a network.

As illustrated in FIG. 5, first processor 25 determines whether search device 20 is not connected to a network. For example, first processor 25 checks the state of communication of second receiver 21 and second transmitter 24 to determine whether or not there is a network connection. When first processor 25 determines the state of not being connected a network, first processor 25 determines whether or not the target device information has been obtained (S111). When the target device information has not been obtained (No in Step S111), first processor 25 returns the processing to Step S111. In other words, first processor 25 enters into a target device information standby state that allows reception of the target device information transmitted by server 10.

Next, in the case where the target device information has been obtained (Yes in Step S111), when first radio signal receiver 23 receives the target device information (S112), first processor 25 encrypts the received target device information to generate target device signals including the target device information. First processor 25 transmits the generated target device signals via first radio signal transmitter 22 (S113).

Next, first processor 25 determines whether or not a response signal has been received within a predetermined period after transmission of the target device signals (S114).

Next, when a response signal is received within the predetermined period (Yes in S114), first processor 25 generates target device discovery information and transmits the generated target device discovery information to server 10 (S115).

When no response signal is received within the predetermined period (No in S114) and when Yes in Step S114 mentioned above, first processor 25 then determines whether or not search device 20 is a search-target device to be recalled (S116).

When search device 20 is included in the target device information as the search-target device to be recalled (Yes in S116), first processor 25 transmits, to server 10, target device discovery information indicating that search device 20 is the search-target device to be recalled (S117). Subsequently, first processor 25 returns the processing to Step S111. Note that Steps S116 and S117 are not essential processes and may be omitted.

Furthermore, also when search device 20 is not the search-target device to be recalled (No in S116), first processor 25 returns the processing to Step S111. Subsequently, the same or like processing is repeated.

Figure 6:
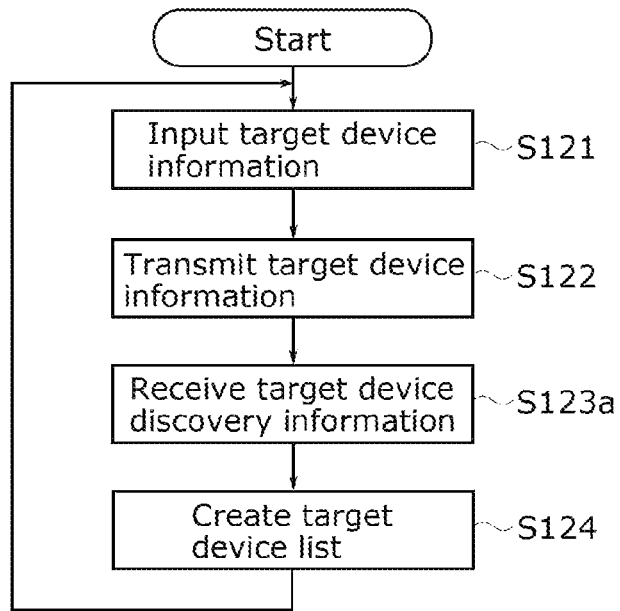
FIG. 6 is a flowchart illustrating one example of processing performed by a server when an electrical device of a device search system according to an embodiment is not connected to a network.

FIG. 6 is a flowchart illustrating one example of processing performed by server 10 when first electrical device 30 of device search system 1 according to the embodiment is not connected to a network.

As illustrated in FIG. 6, when a defect is found in first electrical device 30 produced, server 10 accepts input of target device information which is for use in recall of first electrical device 30 that is defective and which indicates first electrical device 30 (S121). A manufacturer who produced first electrical device 30 inputs the device number, etc., including at least one of the model number and the production number to be used to identify first electrical device 30, and thus server 10 obtains the target device information.

Next, first transmitter 11 of server 10 transmits, to search device 20, the target device information indicating first electrical device 30 (S122). At this time, server 10 is placed on standby for a response to the transmitted target device information.

Next, in the case where first electrical device 30 is not connected to a network, first receiver 12 of server 10 receives target device discovery information from search device 20 as a response to the target device information (S123a).

Next, device manager 13 of server 10 creates a target device list according to the received target device discovery information (S124).

Subsequently, server 10 returns the processing to Step S121.

Figure 7:
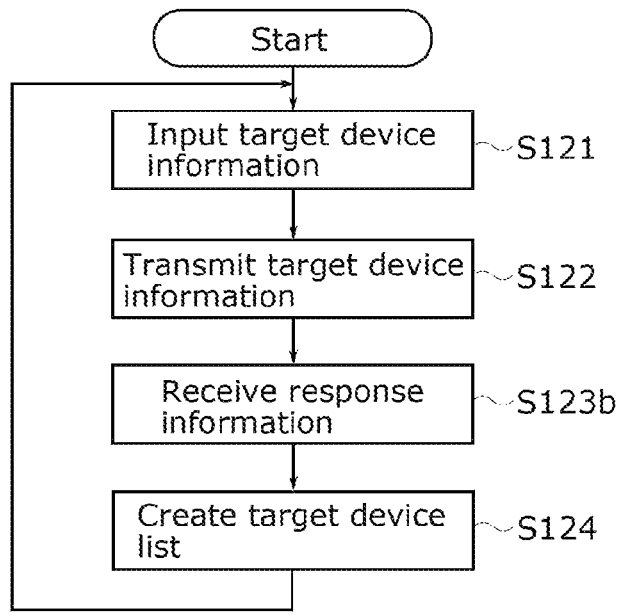
FIG. 7 is a flowchart illustrating one example of processing performed by a server in the case where an electrical device of a device search system according to an embodiment is connected to a network.

FIG. 7 is a flowchart illustrating one example of processing performed by server 10 in the case where first electrical device 30 of device search system 1 according to the embodiment is connected to a network.

As illustrated in FIG. 7, server 10 proceeds to Step S123b after the processes in Steps S121, S122.

In the case where first electrical device 30 is connected to a network, server 10 receives the response information from first electrical device 30 as a response to the target device information (S123b).

Subsequently, server 10 returns the processing to Step S121 after the process in Step S124.

<Effects>

Next, the effects of first electrical device 30, search device 20, device search system 1, the electrical device response method, the electrical device search method, and the non-transitory computer-readable storage medium having a program stored thereon according to the present embodiment will be described.

As described above, first electrical device 30 according to the present embodiment includes: second radio signal receiver 31 that receives target device information indicating a search-target device to be searched for; second processor 32 that determines whether or not first electrical device 30 (this device) is included in the target device information received and first electrical device 30 is connected to a network or whether or not second electrical device 30a capable of communicating with first electrical device 30 is included in the target device information received and second electrical device 30a capable of communicating with first electrical device 30 is connected to the network; and a transmitter (second radio signal transmitter 33 or third transmitter 35) that, when a result of the determination by second processor 32 indicates that first electrical device 30 or second electrical device 30a is included in the target device information, transmits information indicating that first electrical device 30 or second electrical device 30a is the search-target device, as a response (a response signal or response information) using a communication method based on the result of the determination.

With this, when first electrical device 30 is connected to a network, first electrical device 30 can obtain the target device information, and thus first electrical device 30 can determine whether or not first electrical device 30 is the search-target device included in the target device information. Furthermore, even when first electrical device 30 is not connected to a network, first electrical device 30 can receive the target device signal from search device 20, and thus first electrical device 30 can determine whether or not first electrical device 30 is the search-target device included in the target device information. When first electrical device 30 is the search-target device, a response to the target device information is transmitted, and thus the presence of this device can be reported to an external element.

Furthermore, only when the target device signal is received from search device 20, does first electrical device 30 transmit the response. Therefore, compared to the case where the presence of this device is always transmitted to the surroundings, the interception of the response can be minimized, and thus the safety in terms of security is less likely to be compromised.

Therefore, in the case of first electrical device 30, it is possible to easily locate first electrical device 30 and minimize degradation in the security of property where first electrical device 30 is installed.

In particular, in the present embodiment, even if a user has not registered first electrical device 30, it is possible to locate first electrical device 30 or second electrical device 30a as the search-target device. Therefore, in the present embodiment, it is possible to expedite the recall of the search-target device without the user registration.

Furthermore, an electrical device response method according to the present embodiment includes: receiving target device information indicating a search-target device to be searched for; determining whether or not first electrical device 30 is included in the target device information received and first electrical device 30 is connected to a network or whether or not second electrical device 30a capable of communicating with first electrical device 30 is included in the target device information received and second electrical device 30a capable of communicating with first electrical device 30 is connected to the network; and transmitting, when a result of the determination indicates that first electrical device 30 or second electrical device 30a is included in the target device information, information indicating that first electrical device 30 or second electrical device 30a is the search-target device, as a response using a communication method based on the result of the determination.

With this electrical device response method, substantially the same effects as those described above are produced.

Furthermore, a storage medium according to the present embodiment is a non-transitory computer-readable storage medium having stored thereon a program for causing a computer to perform the electrical device response method.

With this storage medium, substantially the same effects as those described above are produced.

Furthermore, in first electrical device 30 according to the present embodiment, when first electrical device 30 or second electrical device 30a included in the target device information received is not connected to the network, second radio signal transmitter 33 transmits the response to search device 20 that locates the search-target device.

With this, when first electrical device 30 or second electrical device 30a is not connected to the network, the response signal can be transmitted to server 10 via search device 20 in response to the target device information. Therefore, it is possible to easily locate the search-target device.

Furthermore, in first electrical device 30 according to the present embodiment, when second radio signal receiver 31 receives a reception completion signal in response to the response signal transmitted to search device 20, second processor 32 transitions to a state of non-communication with second electrical device 30a.

Thus, by receiving the reception completion signal, first electrical device 30 can transition to the state of non-communication with second electrical device 30a which is another electrical device. Therefore, for example, access with malicious intent can be blocked; thus, it is possible to protect first electrical device 30 that is defective.

Furthermore, in first electrical device 30 according to the present embodiment, in the case where first electrical device 30 or second electrical device 30a included in the target device information received is connected to the network, third transmitter 35 transmits the response information via the network to server 10 that manages the target device information.

Thus, in the case where first electrical device 30 or second electrical device 30a is connected to the network, the response information can be transmitted to server 10 in response to the target device information without passing through search device 20. Therefore, it is possible to easily locate the search-target device.

Furthermore, search device 20 according to the present embodiment includes: first radio signal transmitter 22 that transmits a target device signal as target device information indicating a search-target device to be searched for; first radio signal receiver 23 that receives, from first electrical device 30 as a response to the transmission of the target device information, information indicating that first electrical device 30 or second electrical device 30a capable of communicating with first electrical device 30 is included in the target device information; and second transmitter 24 that transmits a notification (target device discovery information) indicating discovery of first electrical device 30 or second electrical device 30a indicated in the target device information, to server 10 that manages the target device information, in accordance with the response received by first radio signal receiver 23.

This allows search device 20 to receive the target device discovery information which is to be transmitted in response to the transmission of the target device information and indicates that first electrical device 30 or second electrical device 30a is included in the target device information.

Furthermore, since search device 20 receives a response to the transmission, the safety in terms of the security of first electrical device 30 is less likely to be compromised as compared to first electrical device 30 that always transmits the response.

Therefore, even with search device 20, it is possible to easily locate the search-target device and minimize degradation in the security of property where first electrical device 30 is installed.

Furthermore, in search device 20 according to the present embodiment, when first radio signal receiver 23 receives the response from first electrical device 30, first radio signal transmitter 22 transmits a reception completion signal to first electrical device 30 in response to the response.

Thus, search device 20 can transmit the reception completion signal to first electrical device 30 that is the search-target device, and therefore first electrical device 30 can take measures such as blocking access with malicious intent, for example.

Furthermore, an electrical device search method according to the present embodiment includes: transmitting a target device signal as target device information indicating a search-target device to be searched for; receiving, from first electrical device 30 as a response to the transmission of the target device information, information indicating that first electrical device 30 or second electrical device 30a capable of communicating with first electrical device 30 is included in the target device information; and transmitting a notification indicating discovery of first electrical device 30 or second electrical device 30a indicated in the target device information, to server 10 that manages the target device information, in accordance with the response received.

With this electrical device search method, substantially the same effects as those described above are produced.

Furthermore, a storage medium according to the present embodiment is a non-transitory computer-readable storage medium having stored thereon a program for causing a computer to perform the electrical device search method.

With this storage medium, substantially the same effects as those described above are produced.

Furthermore, device search system 1 according to the present embodiment includes: first electrical device 30 including second radio signal receiver 31 that receives target device information indicating a search-target device to be searched for, second processor 32 that determines whether or not first electrical device 30 is included in the target device information received and first electrical device 30 is connected to a network or whether or not second electrical device 30a capable of communicating with first electrical device 30 is included in the target device information received and second electrical device 30a capable of communicating with first electrical device 30 is connected to the network, and a transmitter that, when a result of the determination by second processor 32 indicates that first electrical device 30 or second electrical device 30a is included in the target device information, transmits information indicating that first electrical device 30 or second electrical device 30a is the search-target device, as a response using a communication method based on the result of the determination; and search device 20 including first radio signal transmitter 22 that transmits a target device signal as the target device information indicating first electrical device 30, first radio signal receiver 23 that receives, from first electrical device 30 as a response to the transmission of the target device information, information indicating that first electrical device 30 or second electrical device 30a is included in the target device information, and second transmitter 24 that transmits, to server 10 in accordance with the response received by first radio signal receiver 23, a notification indicating discovery of first electrical device 30 or second electrical device 30a indicated in the target device information.

With this, when first electrical device 30 is not connected to the network, first electrical device 30 can obtain the target device information via search device 20. In this case, when first electrical device 30 is included in the target device information, first electrical device 30 can notify server 10 via search device 20 that first electrical device 30 is included in the target device information.

Furthermore, when first electrical device 30 is connected to the network, first electrical device 30 can obtain the target device information from server 10. In this case, when first electrical device 30 is included in the target device information, first electrical device 30 can notify server 10 without using search device 20 that first electrical device 30 is included in the target device information.

With these, server 10 can reliably obtain the notification indicating that first electrical device 30 or a device capable of communicating with first electrical device 30 is included in the target device information.

Furthermore, since first electrical device 30 transmits the response when first electrical device 30 receives the target device signal from search device 20, the safety in terms of security is less likely to be compromised, compared to the case where the presence of first electrical device 30 is always transmitted to the surroundings.

Therefore, with first electrical device 30, it is possible to easily locate the search-target device and minimize degradation in the security of property where first electrical device 30 is installed.

Furthermore, device search system 1 according to the present embodiment further includes server 10 that manages the target device information. When server 10 receives the notification indicating the discovery of first electrical device 30 or second electrical device 30a indicated in the target device information, server 10 creates a target device list indicating first electrical device 30 or second electrical device 30a as the search-target device.

Thus, device search system 1 can create the target device list and therefore be useful in the recall of the search-target device.

[Other Variations, etc.]

The present disclosure has been described thus far based on the embodiment, but the present disclosure is not limited to such embodiment.

For example, in the search-target device, etc., according to the embodiment described above, when the search-target device receives the target device signal, the search-target device may transmit a response signal indicating the state of this device to the server via the search device as a response to the target device signal, such as the case where the first electrical device or the second electrical device malfunctions. Furthermore, when the search-target device receives the target device information, in the case where the first electrical device or the second electrical device malfunctions, the search-target device may transmit response information indicating the occurrence of the malfunction to the server as a response to the target device information. In this case, the server may create a list of target devices that are malfunctioning. Therefore, the target device is not limited to the search-target device to be recalled and may be an electrical device that is malfunctioning.

Furthermore, in the search-target device, etc., according to the embodiment described above, the search device may be able to set a condition about the state of the first electrical device or the second electrical device such that the state, the product number, etc., of a component included in this device are to be reported, for example. In this case, the search device may add the set condition to the target device information and transmit the target device information to the first electrical device or the second electrical device.

Furthermore, the respective processors included in the search-target device, etc., according to the above-described embodiment are typically implemented as large-scale integration (LSI) which is an integrated circuit. These processors may be individually configured as single chips or may be configured so that a part or all of the processors are included in a single chip.

Furthermore, the method of circuit integration is not limited to LSIs, and implementation through a dedicated circuit or a general-purpose processor is also possible. A field programmable gate array (FPGA) which allows programming after LSI manufacturing or a reconfigurable processor which allows reconfiguration of the connections and settings of the circuit cells inside the LSI may also be used.

Note that in the above-described embodiment, the respective structural elements may be configured using dedicated hardware, but may also be implemented by executing software programs suited to the respective structural elements. The respective structural elements may be implemented through the reading and execution of a software program recorded on a recording medium such as a hard disk or semiconductor memory by a program execution unit such as a central processing unit (CPU) or a processor.

Moreover, all the numerical figures used above are given as examples to describe the present disclosure in specific terms, and thus the embodiment according to the present disclosure is not limited by such illustrative numerical figures.

Furthermore, the separation of the function blocks in the block diagrams is merely an example, and plural function blocks may be implemented as a single function block, a single function block may be separated into plural function blocks, or part of functions of a function block may be transferred to another function block. Moreover, the functions of function blocks having similar functions may be processed, in parallel or by time-division, by a single hardware or software product.

Furthermore, the sequence in which the steps included in the flowcharts are executed is given as an example to describe the present disclosure in specific terms, and thus other sequences are possible. Moreover, part of the above-described steps may be executed simultaneously (in parallel) with another step.

Aside from the above, forms obtained by various modifications to the above-described embodiment that can be conceived by a person having ordinary skill in the art as well as forms realized by arbitrarily combining structural elements and functions in the embodiments which are within the scope of the essence of the present disclosure are included in the present disclosure.

INDUSTRIAL APPLICABILITY

The electrical device, the search device, the device search system, the electrical device response method, the electrical device search method, and the storage medium according to the present disclosure are useful as a device, a system, etc., that locate the electrical device in the event of trouble such as when the electrical device is designated as a device to be recalled and when a malfunction occurs in the electrical device.

The invention claimed is:

1. An electrical device, comprising:
a receiver that receives target device information indicating a search-target device, the search-target device being a specific defective electrical device to be searched for;
a processor that determines whether or not the electrical device is included in the target device information received and the electrical device is connected to a network or whether or not a communication device capable of communicating with the electrical device is included in the target device information received and the communication device is connected to the network; and
a transmitter that, when a result of the determination by the processor indicates that the electrical device or the communication device is included in the target device information, transmits information indicating that the electrical device or the communication device is the search-target device, as a response using a communication method based on the result of the determination,
wherein, when the electrical device or the communication device included in the target device information received is not connected to the network, the transmitter transmits the response to a search device that locates the search-target device.

2. The electrical device according to claim 1, wherein when the receiver receives a reception completion signal in response to the response transmitted to the search device, the processor transitions to a state of non-communication with the communication device.

3. The electrical device according to claim 1, wherein in the case where the electrical device or the communication device included in the target device information received is connected to the network, the transmitter transmits the response via the network to a server that manages the target device information.

4. A device search system, comprising:
an electrical device including a receiver that receives target device information indicating a search-target device, the search-target device being a specific defective electrical device to be searched for, a processor that determines whether or not the electrical device is included in the target device information received and the electrical device is connected to a network or whether or not a communication device capable of communicating with the electrical device is included in the target device information received and the communication device is connected to the network, and a transmitter that, when a result of the determination by the processor indicates that the electrical device or the communication device is included in the target device information, transmits information indicating that the electrical device or the communication device is the search-target device, as a response using a communication method based on the result of the determination;
a server that manages the target device information; and
a search device including a signal transmitter that transmits a target device signal as the target device information indicating the search-target device, a receiver that receives, from the search-target device as a response to the transmission of the target device information, information indicating that the electrical device or the communication device is included in the target device information, and an information transmitter that transmits a notification indicating discovery of the electrical device or the communication device indicated in the target device information to the server in accordance with the response received by the receiver,
wherein, when the server receives the notification indicating the discovery of the electrical device or the communication device indicated in the target device information, the server creates a target device list indicating the electrical device or the communication device as the search-target device.

5. An electrical device response method, comprising:
receiving target device information indicating a search-target device, the search-target device being a specific defective electrical device to be searched for;
determining whether or not an electrical device is included in the target device information received and the electrical device is connected to a network or whether or not a communication device capable of communicating with the electrical device is included in the target device information received and the communication device is connected to the network; and
transmitting, when a result of the determination indicates that the electrical device or the communication device is included in the target device information, information indicating that the electrical device or the communication device is the search-target device, as a response using a communication method based on the result of the determination,
wherein, when the electrical device or the communication device included in the target device information received is not connected to the network, the response is transmitted to a search device that locates the search-target device.

6. An electrical device search method, comprising:
transmitting a target device signal as target device information indicating a search-target device, the search-target device being a specific defective electrical device to be searched for;
receiving, from the search-target device as a response to the transmission of the target device information, information indicating that an electrical device or a communication device capable of communicating with the electrical device is included in the target device information;
transmitting a notification indicating discovery of the search-target device or the communication device indicated in the target device information, to a server that manages the target device information, in accordance with the response received; and
when the electrical device or the communication device included in the target device information is not connected to the network, transmitting the response to a search device that locates the search-target device.

7. The electrical device search method according to claim 6, when the response from the search-target device is received, a reception completion signal is transmitted to the search-target device in response to the response.

8. A non-transitory computer-readable storage medium having stored thereon a program for causing a computer to perform the electrical device response method according to claim 5.

9. A non-transitory computer-readable storage medium having stored thereon a program for causing a computer to perform the electrical device search method according to claim 6.

10. A device search system, comprising:
an electrical device including a receiver that receives target device information indicating a search-target device, the search-target device being a specific defective electrical device to be searched for, a processor that determines whether or not the electrical device is included in the target device information received and the electrical device is connected to a network or whether or not a communication device capable of communicating with the electrical device is included in the target device information received and the communication device is connected to the network, and a transmitter that, when a result of the determination by the processor indicates that the electrical device or the communication device is included in the target device information, transmits information indicating that the electrical device or the communication device is the search-target device, as a response using a communication method based on the result of the determination; and a search device including a signal transmitter that transmits a target device signal as the target device information indicating the search-target device, a receiver that receives, from the search-target device as a response to the transmission of the target device information, information indicating that the electrical device or the communication device is included in the target device information, and an information transmitter that transmits a notification indicating discovery of the electrical device or the communication device indicated in the target device information to a server in accordance with the response received by the receiver, wherein, when the electrical device or the communication device included in the target device information received is not connected to the network, the transmitter of the electrical device transmits the response to the search device that locates the search-target device.

11. An electrical device search method, comprising:

transmitting a target device signal as target device information indicating a search-target device, the search-target device being a specific defective electrical device to be searched for;

receiving, from the search-target device as a response to the transmission of the target device information, information indicating that an electrical device or a communication device capable of communicating with the electrical device is included in the target device information;

transmitting a notification indicating discovery of the search-target device or the communication device indicated in the target device information, to a server that manages the target device information, in accordance with the response received; and when the server receives the notification indicating the discovery of the electrical device or the communication device indicated in the target device information, creating a target device list indicating the electrical device or the communication device as the search-target device.

12. The electrical device search method according to claim 11, when the response from the search-target device is received, a reception completion signal is transmitted to the search-target device in response to the response.

13. A non-transitory computer-readable storage medium having stored thereon a program for causing a computer to perform the electrical device search method according to claim 11.

* * * * *